United States Patent
Lee

(10) Patent No.: US 7,921,332 B2
(45) Date of Patent: Apr. 5, 2011

(54) DISC DRIVE FAILURE DIAGNOSTIC SYSTEM AND METHOD

(75) Inventor: Ki-ju Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1669 days.

(21) Appl. No.: 10/859,297

(22) Filed: Jun. 3, 2004

(65) Prior Publication Data

US 2004/0260984 A1 Dec. 23, 2004

(30) Foreign Application Priority Data

Jun. 23, 2003 (KR) .................. 10-2003-0040596

(51) Int. Cl.
*G06F 11/00* (2006.01)
(52) U.S. Cl. ............................... 714/27; 714/43
(58) Field of Classification Search .............. 714/27, 714/42
See application file for complete search history.

(56) References Cited

U.S. PATENT DOCUMENTS

| | | | |
|---|---|---|---|
| 3,806,878 A | 4/1974 | Edstrom | |
| 4,837,764 A | 6/1989 | Russello | |
| 4,885,683 A | 12/1989 | Cogan | |
| 4,964,124 A | 10/1990 | Burnett | |
| 5,835,703 A * | 11/1998 | Konno | 714/42 |
| 5,914,967 A * | 6/1999 | Yomtoubian | 714/718 |
| 6,038,690 A | 3/2000 | Jacobson et al. | |
| 6,173,422 B1 | 1/2001 | Kimura et al. | |
| 6,249,887 B1 * | 6/2001 | Gray et al. | 714/47 |
| 6,347,335 B1 | 2/2002 | Shagam et al. | |
| 6,360,336 B1 | 3/2002 | Christensen et al. | |
| 6,385,739 B1 | 5/2002 | Barton et al. | |
| 6,430,711 B1 | 8/2002 | Sekizawa | |
| 6,493,656 B1 * | 12/2002 | Houston et al. | 702/187 |
| 6,516,427 B1 | 2/2003 | Keyes et al. | |
| 6,532,547 B1 | 3/2003 | Wilcox | |
| 6,578,167 B2 | 6/2003 | Boorom et al. | |
| 6,600,614 B2 | 7/2003 | Lenny et al. | |

(Continued)

FOREIGN PATENT DOCUMENTS

JP 55-112624 8/1980

(Continued)

OTHER PUBLICATIONS

Japanese Office Action issued on Jun. 7, 2005, in Japanese Patent Application No. 2002-315236 which corresponds to the U.S. Appl. No. 10/183,045.

(Continued)

*Primary Examiner* — Bryce P Bonzo
(74) *Attorney, Agent, or Firm* — Staas & Halsey LLP

(57) ABSTRACT

A system and method, which correctly and easily diagnose all types of failures generated in a disc drive, the system includes an interface, a system controller, a failure type diagnosis unit, and an output unit. The interface transmits an operation state information request signal to the disc drive and receives operation state information from the disc drive. The system controller transmits the operation state information request signal to the interface and generates a failure information file using the operation state information when the operation state information is received from the interface. The failure type diagnosis unit analyzes the failure information file generated by the system controller to diagnose the type of failure of the disc drive. The output unit outputs the result of the diagnosis of the type of failure under the control of the system controller.

17 Claims, 5 Drawing Sheets

U.S. PATENT DOCUMENTS

| | | | |
|---|---|---|---|
| 6,710,893 B1 | 3/2004 | Hou et al. | |
| 6,892,317 B1 | 5/2005 | Sampath et al. | |
| 7,293,203 B1 * | 11/2007 | Coatney et al. | 714/42 |
| 2002/0053046 A1 * | 5/2002 | Gray et al. | 714/42 |
| 2003/0193685 A1 | 10/2003 | Kageyama | |
| 2004/0153689 A1 * | 8/2004 | Assaf | 714/1 |

FOREIGN PATENT DOCUMENTS

| | | |
|---|---|---|
| JP | 63-108447 | 5/1988 |
| JP | 5-35542 | 2/1993 |
| JP | 7-13884 | 1/1995 |
| JP | 09-160803 | 6/1997 |
| JP | 09-160843 | 6/1997 |
| JP | 11-249924 | 9/1999 |
| JP | 2002-014795 | 1/2002 |
| KR | 1998-0011123 | 4/1998 |
| KR | 2002-0065143 | 8/2002 |

OTHER PUBLICATIONS

Japanese Office Action issued on Feb. 1, 2006, in Japanese Patent Application No. 2002-315236 which corresponds to the U.S. Appl. No. 10/183,045.

U.S. Appl. No. 10/183,045, filed Jun. 27, 2002, Young-hye Kim, Samsung Electronics Co., Ltd.

Japanese Office action mailed on Jun. 7, 2005.

Korean Office Action issued on Dec. 23, 2004 in corresponding Korean Patent Application No. 10-2003-0040596.

US Office Action issued on Oct. 6, 2003 in related patent application, U.S. Appl. No. 10/183,045.

US Office Action issued on Apr. 6, 2004 in related patent application, U.S. Appl. No. 10/183,045.

US Advisory Action issued on Jun. 22, 2004 in related patent application, U.S. Appl. No. 10/183,045.

US Office Action issued on Nov. 16, 2004 in related patent application, U.S. Appl. No. 10/183,045.

US Office Action issued on Jun. 7, 2005 in related patent application, U.S. Appl. No. 10/183,045.

US Notice of Allowance issued on Dec. 19, 2005 in related patent application, U.S. Appl. No. 10/183,045.

US Supplemental Notice of Allowance issued on Feb. 8, 2006 in related patent application, U.S. Appl. No. 10/183,045.

US Notice of Withdrawal from Issue issued on May 24, 2006 in related patent application, U.S. Appl. No. 10/183,045.

US Office Action issued on Jun. 15, 2006 in related patent application, U.S. Appl. No. 10/183,045.

US Office Action issued on Dec. 22, 2006 in related patent application, U.S. Appl. No. 10/183,045.

US Notice of Allowance issued on Mar. 12, 2008 in related patent application, U.S. Appl. No. 10/183,045.

* cited by examiner

DISC DRIVE FAILURE DIAGNOSTIC SYSTEM AND METHOD

CROSS-REFERENCE TO RELATED APPLICATION

This application claims the priority of Korean Patent Application No. 2003-40596, filed on Jun. 23, 2003 in the Korean Intellectual Property Office, the disclosure of which is incorporated herein by reference.

BACKGROUND OF THE INVENTION

1. Field of the Invention

The present invention relates to a disc drive failure diagnostic system and method, and more particularly, to a system and method that easily diagnoses the type of failure generated in a disc drive.

2. Description of the Related Art

In general, a host controls the operation of a disc drive. In this case, the host is a computer system having application software for operating the disc drive. Thus, the host can control seek, read, and write operations with respect to discs using the application software.

When the disc drive fails, however, the host cannot judge the type of failure in the disc drive. Accordingly, a user should contact a customer service center to diagnose and repair the disc drive. The customer service center must directly check the environment in which the disc drive is used to find out the type of failure.

Furthermore, the procedure of finding out the type of failure in the disc drive is carried out based on apparent states of the failed disc drive. Thus, the types of failures caused by internal operations of the disc drive are difficult to judge and repeatedly occurring failures cannot be prevented.

SUMMARY OF THE INVENTION

An aspect of the present invention provides a system and method that correctly and easily diagnose all types of failures generated in a disc drive.

An aspect of the present invention also provides a system and method that correctly and easily diagnoses the types of failures generated from internal operations of a disc drive.

According to an aspect of the present invention, there is provided a failure diagnostic system for a disc drive, having an interface transmitting an operation state information request signal to the disc drive and receiving operation state information from the disc drive; a system controller transmitting the operation state information request signal to the interface and generating a failure information file using the operation state information when the operation state information is received from the interface; a failure type diagnosis unit analyzing the failure information file generated by the system controller to diagnose the type of failure in the disc drive; and an output unit outputting the diagnosis result of the type of failure under the control of the system controller.

According to another aspect of the present invention, there is provided a disc drive failure diagnostic system connected to a server which diagnoses a disc drive failure through a network, the system having a first interface transmitting an operation state information request signal to a disc drive and receiving operation state information from the disc drive; a system controller transmitting the operation state information request signal to the first interface, generating a failure information file using the operation state information received from the first interface, controlling the failure information file to be transmitted to the server, and outputting a failure type diagnosis result received from the server; a second interface transmitting the failure information file to the server under the control of the system controller through the network and transmitting the failure type diagnosis result to the system controller when the failure type diagnosis result is received from the server through the network; and an output unit outputting the failure type diagnosis result under the control of the system controller.

According to another aspect of the present invention, there is provided a disc drive failure diagnostic system connected to a host operating a disc drive through a network, the system having a failure diagnosis and measure analyzer analyzing a failure information file transmitted from the host through the network based on previously stored failure type diagnosis information, to diagnose the type of failure of the disc drive and generating corresponding failure measure information; and a server transmitting the failure information file to the failure diagnosis and measure analyzer when the failure information file is received from the host through the network and, when a failure type diagnosis result and/or failure measure information is received from the failure diagnosis and measure analyzer, providing the received failure type diagnosis result and/or failure measure information to the host.

According to another aspect of the present invention, there is provided a failure diagnostic method of a disc drive which is operated by a host, including transmitting an operation state information request signal from the host to the disc drive; generating a failure information file using operation state information from the host when the operation state information is received from the disc drive; and analyzing the failure information file based on previously stored failure type diagnosis information of the host to diagnose the type of failure of the disc drive.

According to another aspect of the present invention, there is provided a method of diagnosing a disc drive failure using a host, the disc drive operated by the host, and a server connected with the host through a network, the method including transmitting an operation state information request signal from the host to the disc drive; generating a failure information file using operation state information when the operation state information is received from the disc drive; transmitting the failure information file to the server; and operating the disc drive based on the failure diagnosis result and/or failure measure information, when a failure diagnosis result and/or failure measure information with respect to the failure information file is received from the server.

According to another aspect of the present invention, there is provided a method of diagnosing a disc drive failure using a host, the disc drive operated by the host, a server connected with the host through a network, and a failure diagnosis and measure analyzer connected to the server, the method including transmitting a failure information file with respect to operation state information of the disc drive to the failure diagnosis and measure analyzer when the failure information file is received from the host; and transmitting a failure type diagnosis result and/or failure measure information corresponding to the failure information file to the host when the failure type diagnosis result and/or failure measure information is received from the failure diagnosis and measure analyzer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
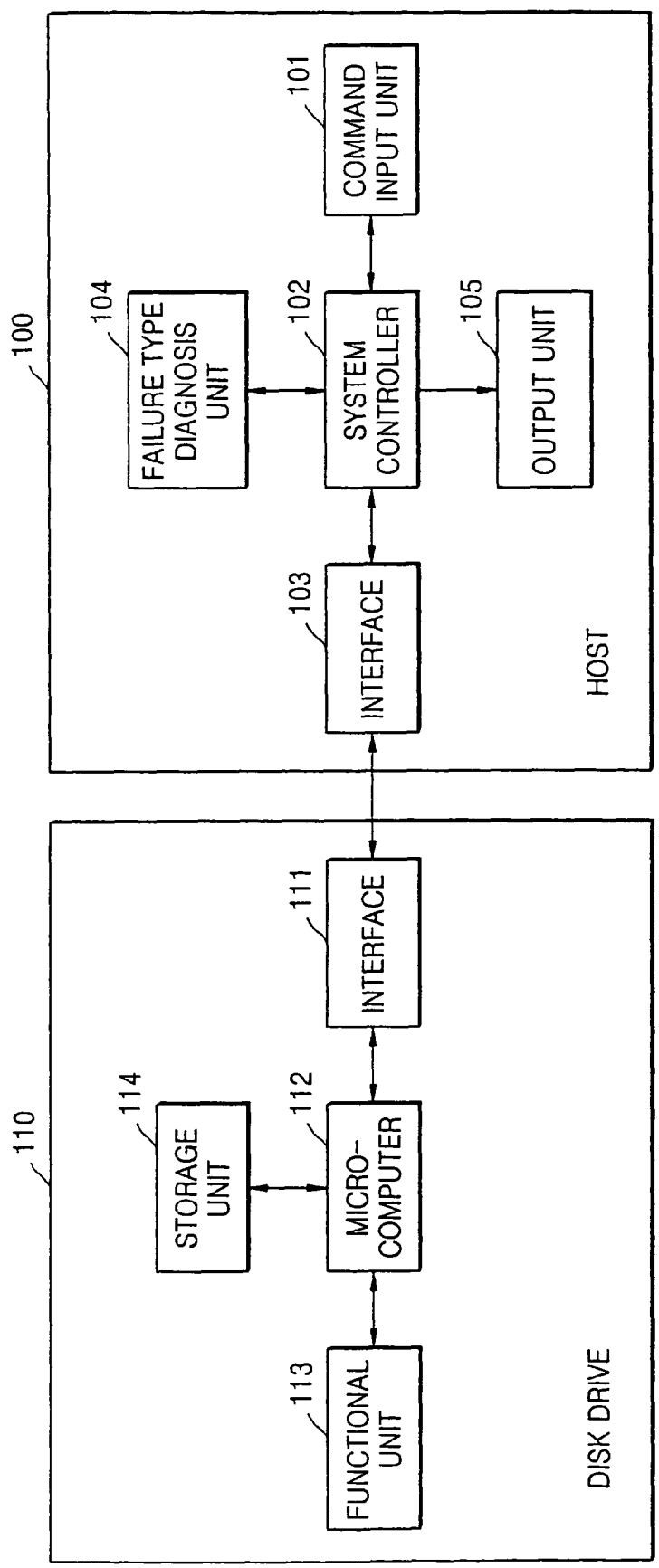
FIG. 1 is a block diagram of a disc drive failure diagnostic system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a disc drive failure diagnostic system according to an embodiment of the present invention. Referring to FIG. 1, the system includes a host 100 and a disc drive 110. The host 100 is connected to the disc drive 110 using wired and/or wireless connections using interfaces 111, 103. The disc drive 110 can be any drive used for recording data including, but not limited to, magnetic, magneto optical, and optical drives such as hard drives, CD drives, DVD drives, and next generation DVD (i.e., Bluray and/or Advanced Optical Disc) drives. The host 100 has a command input unit 101, a system controller 102, an interface 103, a failure type diagnosis unit 104, and an output unit 105 in order to make a diagnosis of a failure of the disc drive 110. The user of the host 100 inputs commands through the command input unit 101. When the disc drive 110 is not operating normally, the user can input a signal requesting operation state information of the disc drive 110 using the command input unit 101.

When the command input unit 101 outputs the operation state information request signal, the system controller 102 transmits the signal to the interface 103. Then, the interface 103 outputs the operation state information request signal to the disc drive 110. When the interface 103 receives the operation state information from the disc drive 110, the interface 103 delivers the received operation state information to the system controller 102.

Upon receipt of the operation state information, the system controller 102 generates a failure state file using the received operation state information. The system controller 102 converts the operation state information into the failure state file using a method of converting data into a file, which is executed in a conventional microprocessor according to an aspect of the invention. The system controller 102 outputs the generated failure state file to the failure type diagnosis unit 104.

The failure type diagnosis unit 104 analyzes the failure state file based on previously set failure type diagnosis information according to an aspect of the invention. The operation state information included in the failure state file has a format coded by types of operations of the disc drive. For example, an interfacing operation, a servo operation and a decoding operation of the disc drive are respectively set to '01', '02' and '03'. Even the sub-operations of each of the operations are coded. When the interfacing operation has n sub-operations, for instance, there exist n sub-codes as a sub-structure of the code '01'. If m sub-operations are generated in the servo operation, there exist m sub-codes as a sub-structure of the code '02'.

The failure type diagnosis information also has the same information format coded by types of operations of the disc drive as that of the operation state information. The failure type diagnosis unit 104 can have failure type diagnosis information on a plurality of disc drive models. The failure type diagnosis information can be code information on all operations, which is generated when a corresponding disc drive model operates normally.

The failure type diagnosis unit 104 compares corresponding failure type diagnosis information with the failure state file to judge whether or not there is a failure for each operation of the disc drive 110 so as to diagnose the type of failure generated in the disc drive 110. The above-mentioned comparison can be carried out in codes.

When codes having values different from each other are detected from the comparison, the failure type diagnosis unit 104 judges that a failure is generated in the operation of the disc drive 110 corresponding to the detected codes and generates information indicating the corresponding operation of the disc drive 110 as the failure type diagnosis result. The information representing the operation of the disc drive 110 can have a coded format. The generated failure type diagnosis result is output to the system controller 102.

Upon receipt of the failure type diagnosis result, the system controller 102 outputs the result via the output unit 105. The output unit 105 displays the diagnosis result such that the user is able to recognize the type of failure generated in the disc drive 110. While described as displaying, it is understood that the output unit 105 could output the result through audio. Additionally, the output unit 105 and/or the input unit 101 could be disposed outside of the host 100 and need not be collocated.

In the meantime, the disc drive 110 operates such that it can provide the operation state information to the host 100 when requested to do so from the host 100. For this, the disc drive 110 consists of an interface 111, a microcomputer 112, a functional unit 113, and a storage unit 114.

The interface 111 can receive the operation state information request signal as well as a control signal for operating the functional unit 113 from the host 100. The interface 111 can transmit information that must be sent to the host 100 among information generated when the functional unit 113 executes its operations.

The microcomputer 112 operates firmware to control the functional unit 113 when it receives a control signal for operating the disc drive 110 from the interface 111 according to an aspect of the invention. Here, the microcomputer 112 stores operation state information of the disc drive 110, which is generated while the firmware operates for each operation of the disc drive 110, in the storage unit 114. The operation state information has the format coded by types of operations of the disc drive 110 as described above with respect to the host 100. The types of operations of the disc drive 110 can divide an interface, a servo, a hardware chip, and so on.

The storage unit 114 stores the operation state information of the disc drive 110, which is generated while operating the firmware.

The functional unit 113 can carry out all functions executed in the disc drive 110. It can include a servo unit (not shown), a motor (not shown), a digital processor (not shown), etc., for example. While shown as separate, it is understood that the disc drive 110 can be included in a computer or can be stand alone.

FIG. 1 shows an example where the failure type diagnosis unit 104 is included in the host 100. However, the failure type diagnosis unit 104 can be separate from the host 100.

Figure 2:
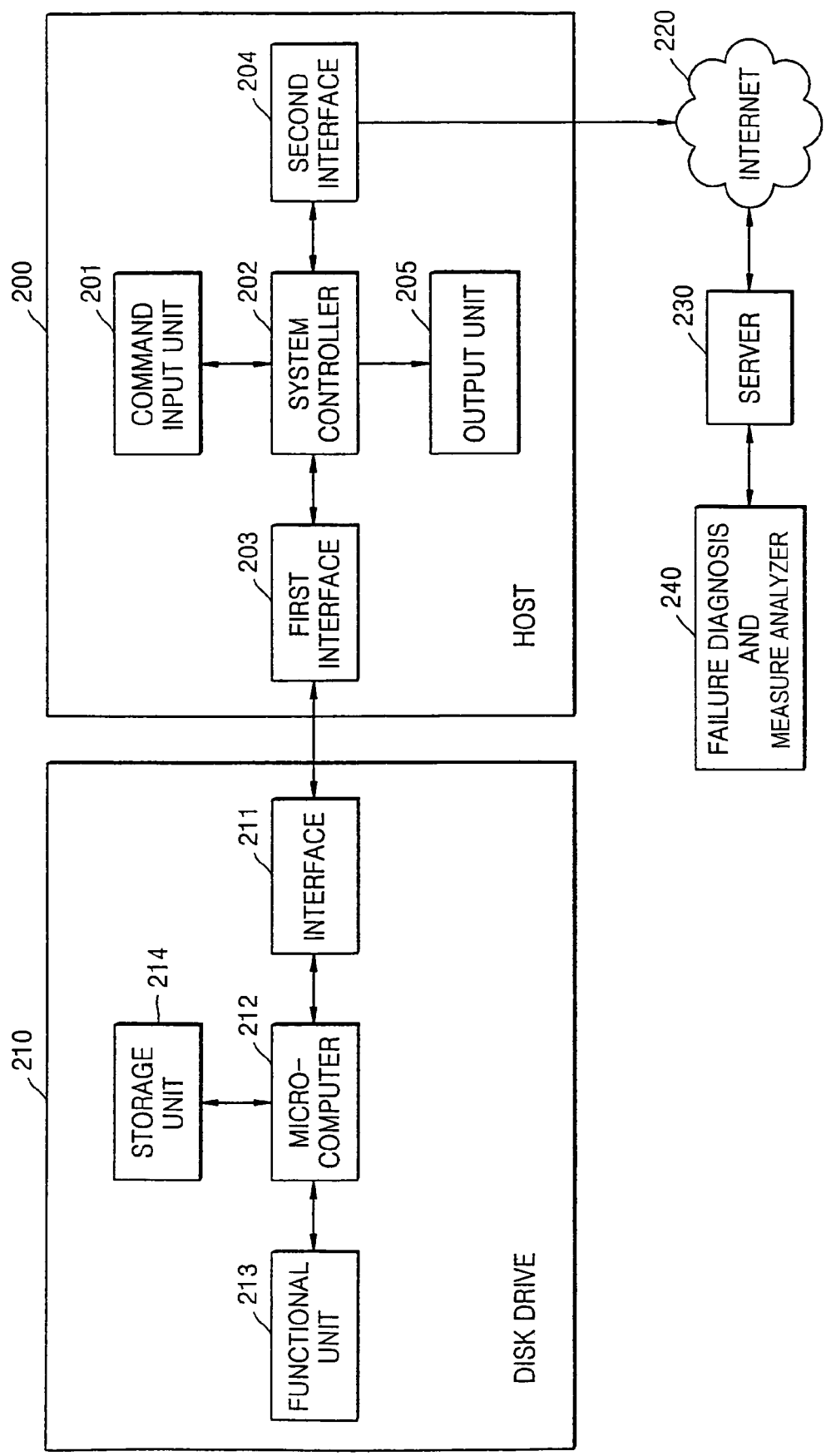
FIG. 2 is a block diagram of a disc drive failure diagnostic system according to another embodiment of the present invention.

FIG. 2 is a block diagram of a disc drive failure diagnostic system according to another embodiment of the present invention. Referring to FIG. 2, the system includes a host 200, a disc drive 210, Internet 220, a server 230 and a device 240 for diagnosing the type of failure and measuring the failure (hereinafter referred to as a failure diagnosis and measuring analyzer).

According to an aspect of the present invention, in order to diagnose a failure of the disc drive 210, the host 200 transmits/receives data to/from the server 230 through a network such as the Internet 220. The host 200 consists of a command input unit 201, a system controller 202, first and second interfaces 203 and 204, and an output unit 205. While described as an Internet 220, it is understood that other types of wired and/or wireless networks can be used, and that the network can include an intranet, a local area network (LAN), a wide area network (WAN) or other such systems.

The command input unit 201 is used by the user to input commands as described in FIG. 1. Thus, the user can input a signal requesting operation state information of the disc drive 210 via the command input unit 201 when the disc drive 210 does not operate normally.

Upon receipt of the operation state information request signal from the command input unit 201, the system controller 202 transmits the signal to the disc drive 210 through the first interface 203. When operation state information of the disc drive 210 is received through the first interface 203, the system controller 202 generates a failure information file using the received operation state information. The method of generating the failure information file using the received operation state information is substantially identical to the method used by the system controller 102 of FIG. 1 according to an aspect of the invention. The system controller 202 outputs the generated failure information file to the second interface 204.

When the system controller 202 receives a failure type diagnosis result and/or failure measure information from the second interface 204, the system controller 202 outputs the failure type diagnosis result and/or failure measure information to the output unit 205. Accordingly, the user can become aware of the type of failure of the disc drive 210 via the output unit 205. If the failure measure information includes a firmware and firmware update instructions for the disc drive 210, the system controller 202 transmits a signal for driving the disc drive 210 to update the firmware of the disc drive to the disc drive 210 via the first interface 203. Similarly, if a software or driver update is required for the host 200 or other computer using the disc drive 210, a command is sent to retrieve the software and/or driver.

The disc drive 210 operates in the substantially same manner as the disc drive 110 shown in FIG. 1. Thus, the construction and operation of an interface 211, a microcomputer 212, a functional unit 213 and a storage unit 214 included in the disc drive 210 are substantially identical to the construction and operation of the interface 111, microcomputer 112, functional unit 113 and storage unit 114 of the disc drive 110 shown in FIG. 1, and a description thereof is not again presented.

The Internet 220 is a conventional wired and/or wireless network using a computer according to an aspect of the invention. The server 230 is a computer system that provides services for diagnosing the type of failure of the disc drive 210. When the server 230 receives the failure information file through the Internet 220, it requests the failure diagnosis and measure analyzer 240 to analyze the received failure information file.

Upon receipt of a corresponding failure type diagnosis result and/or failure measuring information from the failure diagnosis and measure analyzer 240, the server 230 transmits the failure type diagnosis result and/or failure measure information to the host 200 through the Internet 220. Here, the server 230 can include a function for storing the failure information file, failure type diagnosis result, and/or failure measure information for the disc drive 210 and/or other drives according to an aspect of the invention.

When the failure diagnosis and measure analyzer 240 receives the failure information file from the server 230, the failure diagnosis and measure analyzer 240 analyzes the received failure information file to diagnose the type of failure. If failure measure information corresponding to the diagnosed failure type is prepared, the failure diagnosis and measure analyzer 240 provides the failure type diagnosis result together with corresponding failure measure information to the server 230. While shown as being separate, it is understood that the embodiments of the invention shown in FIGS. 1 and 2 can be combined such that the diagnosis unit 104 is supplemented by the analyzer 240 such as for the purpose of obtaining the failure measure information.

Figure 3:
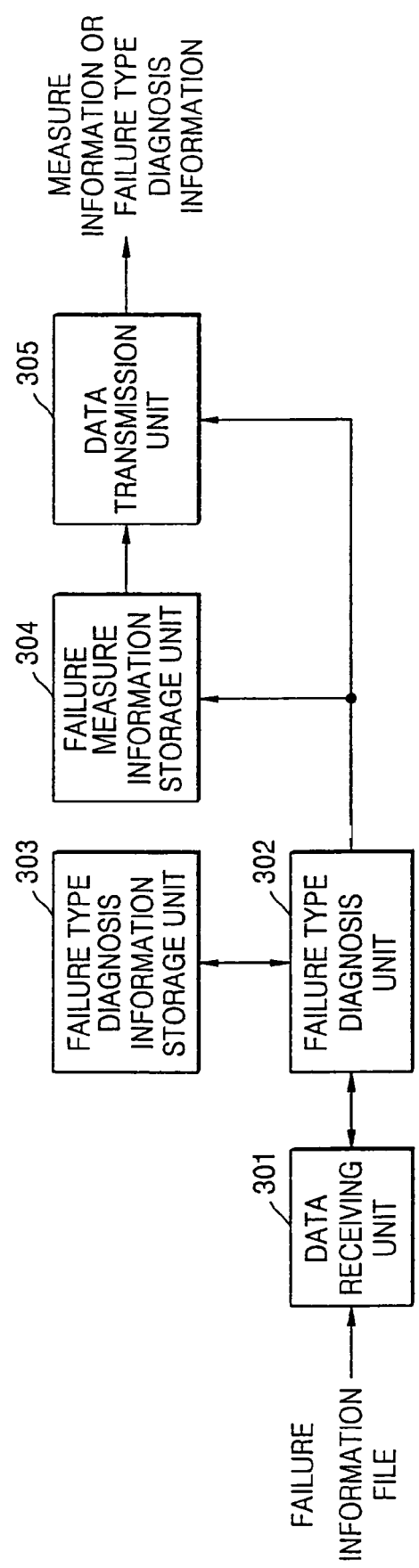
FIG. 3 is a detailed block diagram of the failure diagnosis and measuring analyzer shown in FIG. 2.

An embodiment of the failure diagnosis and measure analyzer 240 is constructed as shown in FIG. 3. Referring to FIG. 3, the failure diagnosis and measure analyzer 240 has a data receiving unit 301, a failure type diagnosis unit 302, a failure type diagnosis information storage unit 303, a failure measure information storage unit 304 and a data transmission unit 305.

The data receiving unit 301 receives the failure information file from the server 230. While described as passing through a server 230, it is understood that such information can be directly sent to the data receiving unit 301, such as through a dial up connection, instant messaging or using a peer-to-peer network. The failure type diagnosis unit 302 receives the failure information file from the data receiving unit 301 and analyzes the failure information file based on the failure type diagnosis information stored in the failure type diagnosis information storage unit 303 to diagnose the type of failure generated in the disc drive 210. Diagnosis of the type of failure is carried out in the same manner as that of the failure type diagnosis unit 104 shown in FIG. 1. Upon diagnosis of the type of failure of the disc drive 210, the failure type diagnosis unit 302 transmits information of the diagnosed failure type to the failure measure information storage unit 304 and data transmitting unit 305.

The failure type diagnosis information storage unit 303 stores code information with respect to the operation state information generated by the operation of firmware when each disc drive model operates normally. Accordingly, the failure type diagnosis information storage unit 303 can store code information for operation state information with respect to a plurality of disc drive models. The code information stored in the failure type diagnosis information storage unit 303 can have the same form as that of the failure type diagnosis information previously stored in the failure type diagnosis unit 104 of FIG. 1.

The failure measure information storage unit 304 can store a plurality of measuring information in advance. For instance, when firmware of a disc drive model is updated, the failure measure information storage unit 304 can previously store the updated firmware information.

Upon receipt of the failure type diagnosis information from the failure type diagnosis unit 302, the failure measure information storage unit 304 outputs failure measure information corresponding to the received failure type diagnosis information using the stored code information and/or measure information corresponding to the model of the disc drive 210. When the corresponding measuring information is firmware update information, for example, the failure measure information storage unit 304 outputs firmware information and a request signal of firmware update as the failure measure information. If there is no failure measure information corresponding to the received failure type diagnosis information, no failure measure information is output from the failure measure information storage unit 304.

The data transmission unit 305 transmits the failure measure information received from the failure measure information storage unit 304 and the failure type diagnosis information received from the failure type diagnosis unit 302 to the server 230. While not required, if no failure information is available, a message so indicating is sent according to an aspect of the invention.

Figure 4:
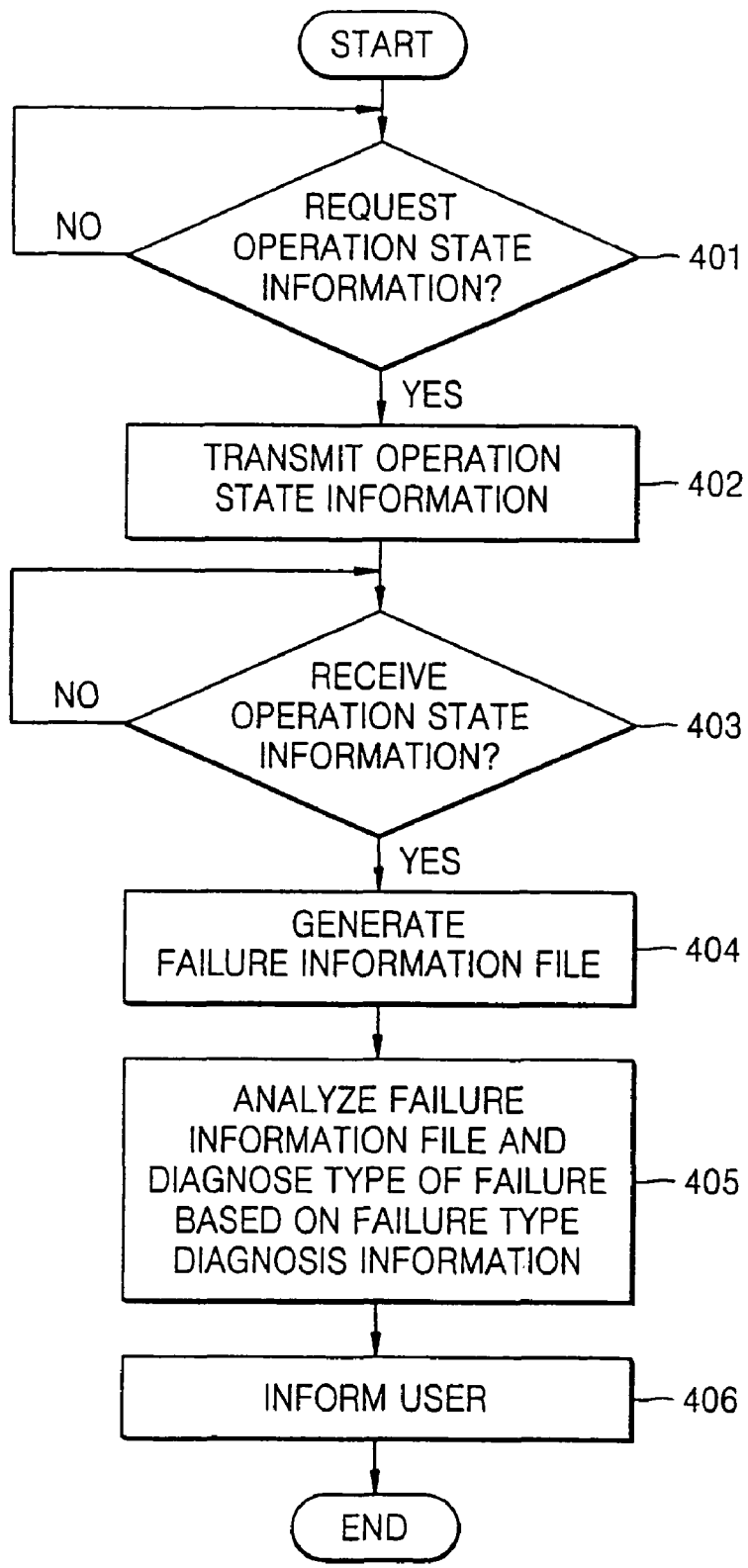
FIG. 4 is a flow chart showing a disc drive failure diagnostic method according to an embodiment of the present invention.

FIG. 4 is a flow chart showing a disc drive failure diagnostic method according to an embodiment of the present invention. This method corresponds to the embodiment of FIG. 1 according to an aspect of the invention. Thus, the procedure of FIG. 4 is explained with reference to the embodiment shown in FIG. 1. While not required, it is understood that the procedure of FIG. 4 can be implemented using software on at least one computer readable medium used on one or more computers.

When the host 100 judges that the signal requesting operation state information of the disc drive 110 is received from the user in operation 401, the host transmits the operation state information request signal to the disc drive 110 in operation 402.

When the host 100 judges that the operation state information with respect to the disc drive 110 has been received in operation 403, the host 100 generates the failure information file using the operation state information of the disc drive 110 in operation 404. Generation of the failure information file using the operation state information is carried out in the same manner as that described above in relation to the embodiment shown in FIG. 1.

In operation 405, the host 100 analyzes the failure information file based on the previously stored failure type diagnosis information, to diagnose the type of failure generated in the disc drive 110. The failure type diagnosis information is substantially identical to that explained in FIG. 1 according to an aspect of the invention. In operation 406, the host 100 informs the user of the diagnosis result.

Figure 5:
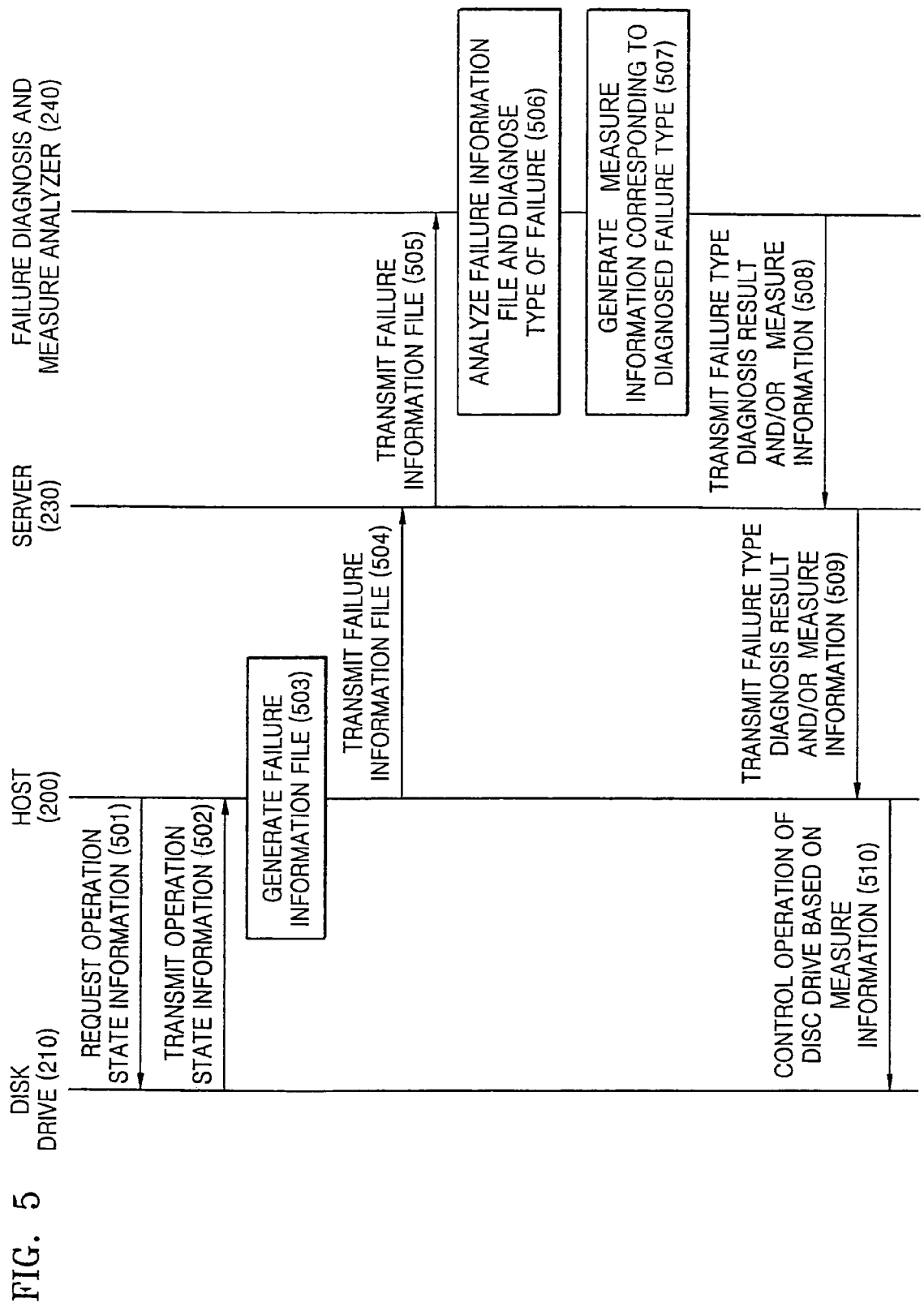
FIG. 5 is a flow chart showing a disc drive failure diagnostic method according to another embodiment of the present invention.

FIG. 5 is a flow chart showing a disc drive diagnostic method according to another embodiment of the present invention, which generally corresponds to the embodiment of FIG. 2. Thus, the procedure of FIG. 5 is explained with reference to the embodiment shown in FIG. 2. While not required, it is understood that the procedure of FIG. 5 can be implemented using software encoded on at least one computer readable medium using at least one computer such as the host 200 and/or the analyzer 240.

In operation 501, the host 200 transmits the signal requesting operation state information to the disc drive 210. When the host 200 receives operation state information from the disc drive 210 in operation 502, the host 200 generates the failure information file using the operation state information in operation 503.

In operation 504, the host 200 transmits the failure information file to the server 230 through the Internet 220. In operation 505, the server 230 sends the received failure information file to the failure diagnosis and measure analyzer 240.

In operation 506, the failure diagnosis and measure analyzer 240 analyzes the received failure information file to diagnose the type of failure. In operation 507, the failure diagnosis and measure analyzer 240 generates failure measure information corresponding to the diagnosed failure type. If the failure measure information corresponding to the diagnosed failure type does not exist, no failure measure information is generated, even if the analyzer 240 has carried out the operation for generating the failure measure information.

In operation 508, the failure diagnosis and measure analyzer 240 transmits the failure type diagnosis result and/or failure measure information to the server 230. If no failure measure information is available, the analyzer 240 sends a message so indicating. In operation 509, the server 230 sends the received failure type diagnosis result and/or failure measure information to the host 200.

In operation 510, the host 200 controls the operation of the disc drive 210 based on the received failure measure information. When the received measure information includes firmware update information, the host 200 can control the operation of the disc drive 210 to update the firmware of the disc drive 210. When the host 200 does not receive the failure measure information, the host 200 can output a failure type diagnosis result allowing the user to recognize the type of failure.

According to the above-described system and method of diagnosing a disc drive failure of the present invention, all types of failures generated in the disc drive can be diagnosed rapidly and easily. Furthermore, the internal operation state of the disc drive is monitored based on the firmware of the disc drive to diagnose the type of failure so that even a failure due to the internal operation of the disc drive can be correctly diagnosed. In addition, it is possible to prevent the repetition of the same type of failure by automatically updating the firmware of the disc drive if required. While described in terms of a disc drive, it is understood that the method and apparatus of the invention can be used with other devices which can be networked and for which diagnostics can be performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A failure diagnostic system for a disc drive, comprising:
an interface transmitting an operation state information request signal to the disc drive and receiving operation state information from the disc drive;
a system controller transmitting the operation state information request signal through the interface to the disc drive and converting the operation state information received through the interface into a failure information file using a method of converting data into a file;
a failure type diagnosis analyzer analyzing the failure information file generated by the system controller to diagnose a type of failure in the disc drive; and
an output unit outputting a result of the diagnosis of the type of failure according to the system controller,
wherein the failure type diagnosis analyzer compares previously stored failure type diagnosis information including a first group of codes with the generated failure information file, which includes a second group of codes, and when the first group of codes and the second group of codes are detected as not being identical to each other, judges that a failure is generated in an operation of the disc drive corresponding to the detected non-identical codes.

2. The system as claimed in claim 1, wherein the operation state information has a format coded by types of operations of the disc drive.

3. The system as claimed in claim 2, wherein the operation state information is generated according to an operation of firmware of the disc drive.

4. A disc drive failure diagnostic system connected to a server which diagnoses a disc drive failure through a network, the system comprising:
 a first interface transmitting an operation state information request signal to a disc drive and receiving operation state information from the disc drive;
 a system controller transmitting the operation state information request signal through the first interface to the disc drive, converting the operation state information received through the first interface into a failure information file using a method of converting data into a file, controlling the generated failure information file to be transmitted to the server, and outputting a failure type diagnosis result received from the server;
 a second interface transmitting the generated failure information file to the server according to the system controller through the network and transmitting the failure type diagnosis result to the system controller when the failure type diagnosis result is received from the server through the network; and
 an output unit outputting the received failure type diagnosis result according to the system controller,
 wherein the failure type diagnosis result is obtained by comparing a-previously stored failure type diagnosis information including a first group of codes with the generated failure information file, which includes a second group of codes, and when the first group of codes and the second group of codes are detected as not being identical to each other, judging that a failure is generated in an operation of the disc drive corresponding to the detected non-identical codes.

5. The system as claimed in claim 4, wherein, when failure measure information is received from the server together with the failure type diagnosis result, the system controller transmits a signal for driving the disc drive to the disc drive via the first interface based on the failure measure information.

6. The system as claimed in claim 5, wherein, when the failure measure information includes information requesting a firmware update for the disc drive, the system controller transmits the information requesting the firmware update for the disc drive to the disc drive via the first interface.

7. A failure diagnostic method of a disc drive which is operated by a host, comprising:
 transmitting an operation state information request signal from the host to the disc drive;
 converting operation state information received from the disc drive into a failure information file including a second group of codes using a method of converting data into a file; and
 analyzing the failure information file based on failure type diagnosis information previously stored by the host and including a first group of codes to diagnose a type of failure of the disc drive,
 wherein the analyzing of the failure information file comprises comparing the previously stored failure type diagnosis information, including the first group of codes, with the generated failure information file, including the second group of codes, and judging that a failure is generated in an operation of the disc drive when the first group of codes and the second group of codes are detected as not being identical to each other.

8. The method as claimed in claim 7, further comprising outputting the failure type diagnosis result such that a host user can recognize the result.

9. A method of diagnosing a disc drive failure using a host, the disc drive operated by the host, and a server connected with the host through a network, the method comprising:
 transmitting an operation state information request signal from the host to the disc drive;
 converting operation state information when the operation state information is received from the disc drive according to the operation state information request signal into a failure information file using a method of converting data into a file;
 transmitting the generated failure information file to the server; and
 operating the disc drive based on a failure diagnosis result and/or failure measure information, when a failure diagnosis result and/or failure measure information with respect to the failure information file is received from the server,
 wherein at least one of the failure type diagnosis result and the failure measure information are obtained by comparing a-previously stored failure type diagnosis information including a first group of codes with the generated failure information file, which includes a second group of codes, and judging that a failure is generated in an operation of the disc drive when the first group of codes and the second group of codes are detected as not being identical to each other.

10. The method as claimed in claim 9, wherein, when the failure measure information includes firmware for the disc drive and information for updating the firmware, the disc drive updates the firmware of the disc drive.

11. A diagnostic system for an apparatus, comprising:
 an interface transmitting an operation state information request signal to the disc drive and receiving operation state information from the apparatus;
 a system controller receiving the operation state information from the interface and converting the received operation state information into a failure information file using a method of converting data into a file;
 a failure type diagnosis analyzer analyzing the failure information file generated by the system controller to diagnose a type of failure in the apparatus and outputting a result of the type of failure in the apparatus, wherein the type of failure in the apparatus is diagnosed by comparing the failure information file with the failure state file,
 wherein the failure type diagnosis analyzer compares a-previously stored failure type diagnosis information including a first group of codes with the received failure information file, which includes a second group of codes, and judges that a failure is generated in an operation of the disc drive when the first group of codes and the second group of codes are detected as not being identical to each other.

12. The system of claim 11, wherein the apparatus is a disc drive, and the operation state information has a format coded by types of operations of the disc drive.

13. The system of claim 12, wherein the apparatus is a disc drive, and operation state information is generated according to operation of firmware for the disc drive.

14. The system of claim 11, wherein the failure type diagnosis analyzer is in a host including the system controller.

15. The system of claim 11, wherein the failure type diagnosis analyzer is connected to the system controller across a network.

16. The system of claim 11, wherein the result is output in an output unit.

17. A method of diagnosing disc failure, comprising:

outputting an operation state information request signal and receiving operation state information according to the request;

converting the received operation state information into a failure information file, which includes a second group of codes, using a method of converting data into a file;

analyzing the generated failure state file including the second group of codes with stored failure type diagnosis information, which includes a first group of codes, to diagnose a type of disc failure; and informing a host of the diagnosis of the type of disc failure, wherein the analysis compares the failure type diagnosis information including the first group of codes with the failure state file including the second group of codes and when the first group of codes and the second group of codes are detected as not being identical to each other, judges that a failure is generated in an operation of a disc drive corresponding to the second group of codes.

\* \* \* \* \*

UNITED STATES PATENT AND TRADEMARK OFFICE
CERTIFICATE OF CORRECTION

| | | |
|---|---|---|
| PATENT NO. | : 7,921,332 B2 | Page 1 of 1 |
| APPLICATION NO. | : 10/859297 | |
| DATED | : April 5, 2011 | |
| INVENTOR(S) | : Ki-ju Lee | |

It is certified that error appears in the above-identified patent and that said Letters Patent is hereby corrected as shown below:

Column 9, Line 34, In Claim 4, delete "a-previously" and insert --previously--, therefor.

Column 10, Line 28, In Claim 9, delete "a-previously" and insert --previously--, therefor.

Column 10, Line 55, In Claim 11, delete "a-previously" and insert --previously--, therefor.

Signed and Sealed this
Third Day of January, 2012

David J. Kappos
*Director of the United States Patent and Trademark Office*